United States Patent [19]

Wallasch

[11] Patent Number: 5,680,022
[45] Date of Patent: Oct. 21, 1997

[54] REVERSING MOTOR SPEED CONTROLLER WITH JOYSTICK

[76] Inventor: Lutz Wallasch, 1036 Archer Pl., Baldwin, N.Y. 11510

[21] Appl. No.: 554,287

[22] Filed: Nov. 6, 1995

[51] Int. Cl.$^6$ .................................................. H02P 7/00
[52] U.S. Cl. .................. 318/547; 318/295; 388/840
[58] Field of Search ........................... 318/280–286, 318/547, 549, 268, 269, 256, 257, 291, 295; 388/827, 838–841, 937; 200/4, 5 EB, 178, 6 A, 176

[56] References Cited

U.S. PATENT DOCUMENTS

| | | | |
|---|---|---|---|
| 3,231,767 | 1/1966 | Powell | 310/71 |
| 4,066,934 | 1/1978 | Waldorf | 318/139 |
| 4,241,298 | 12/1980 | Trammeli | 318/17 |
| 4,469,330 | 9/1984 | Asher | 200/6 A |
| 4,506,198 | 3/1985 | Savas | 388/839 |
| 4,634,941 | 1/1987 | Klimo | 318/139 |
| 4,903,318 | 2/1990 | Nagata | 388/840 |
| 4,958,118 | 9/1990 | Pottebaum | 318/727 |
| 4,975,627 | 12/1990 | Reddy | 318/372 |
| 5,136,130 | 8/1992 | Daly | 200/318.1 |
| 5,140,246 | 8/1992 | Rarick | 318/779 |
| 5,225,831 | 7/1993 | Osborn | 200/6 A |
| 5,233,228 | 8/1993 | Krieg | 200/4 |

*Primary Examiner*—Jonathan Wysocki
*Attorney, Agent, or Firm*—Alfred M. Walker

[57] ABSTRACT

A simple speed controller for small direct current motors having a hollow body with a joystick extending out from the body. Within the housing the two facing side walls have nonconductive substrates with conductive traces. Transistors are connected to both substrates and the joystick has conductors to act as wipers for potentiometers which act to control the speed of the motor.

6 Claims, 5 Drawing Sheets

REVERSING MOTOR SPEED CONTROLLER WITH JOYSTICK

FIELD OF THE INVENTION

The present invention relates to a speed controller for small direct current permanent magnet (DC) motors, including a joystick for controlling motor speed and direction.

BACKGROUND OF THE INVENTION

The prior art includes industrial inspection processes using X-rays for the non-destructive testing of castings. In the course of this work, small DC PM gear motors are used to power mechanical positioners or actuators. A typical example of this small gear motor is the "Micro Mo" series 2225 motors of Micro Mo Electronics, Inc. of St. Petersburg, Fla. 33701. This type of motor reverses direction if the polarity of the DC supply voltage is reversed at its terminals.

Prior art positioner devices for motors include the "Micro Mo" series MCX-03 electronic speed controller.

Among the prior art patents for electronic motor speed controllers are U.S. Pat. Nos. 3,231,767 of Powell, 4,066,934 of Waldorf, 4,241,298 of Trammell, 4,506,198 of Savas, 4,958,118 of Pottebaum, 4,975,627 of Reddy, 5,136,130 of Daly, and 5,140,246 of Rarick.

Of the prior art patents, Powell '767 patent describes a mechanical control device with a moving knob 44. However, the knob does not move arcuately.

Waldorf '934 describes a speed controller for a DC motor, with an operator controlled foot accelerometer.

Savas '198 describes a spring biased trigger which moves left and right, with movable contacts.

Trammell '298 discloses a trigger and contact pairs with fixed mechanical contacts.

Daly '130 describes a trigger with a button movable between first and second positions.

Rarick '246 describes complicated circuitry for a speed controller.

The prior art positioners for the appropriate X-ray machines, are of two sizes such as known as "five pound" positioners and "thirty-five pound" positioners.

The motors for controlling the various axes of these positioners range from about five to fifty watts output. When using these X-ray machine positioners, an open-loop control by an operator viewing the operation on a TV monitor is required.

Moreover, in an industrial environment with high powered X-ray and video equipment, the motor controllers need to operate with low electrical noise emission and high electrical noise immunity.

Many sophisticated closed-loop motor speed controllers are known in the prior art. Some of the prior art speed controllers require a host computer or digital controller. These prior art speed controllers are rather large, expensive and difficult to set up and maintain in an industrial environment. They are also not very rugged and may be subject to transient electrical interference.

Another problem encountered with prior art servo-controllers is a tendency to creep, or move the motors slightly, or "jitter" at the off position when the motor should be stationary.

Other prior art speed controllers involve replacing the positioners with new versions using stepper motors. However, the use of positioners with stepper motors involves a capital investment and is not desirable because of the increased size of the stepper motors as compared to the PM DC motors of equivalent output.

The granularity of a full-step control is also not a desirable alternative, thereby negating the simplicity of a stepper motor control by being forced into a micro-stepping type of a controller.

OBJECTS OF THE INVENTION

It is therefore an object of the present invention to provide a manually operable speed controller for small direct current (DC) motors.

It is yet another object to provide a speed controller with a low system cost for controller and power supply.

It is yet another object to provide a compact, small sized controller for small direct current (DC) motors, which is easy to use and set up.

It is a further object to provide a continuous, as opposed to stepped, speed control device for small direct current (DC) motors.

It is yet another object to provide a speed control for small direct current (DC) motors, with a resistance to "creep" at a null point.

It is yet a further object to provide a small direct current (DC) motor with low electrical noise generation and susceptibility.

It is a further object to provide a small direct current (DC) motor which is manufacturable with low tooling cost.

It is yet still another object to provide a small direct current (DC) motor which can be repairable by personnel with no electronics training.

It is a further object to improve over the disadvantages of the prior art.

SUMMARY OF THE INVENTION

In keeping with these objects and others, which may become apparent, the present invention includes a simple, speed controller for small direct current (DC) motors.

Moreover, while the motor speed controller of the present invention is designed for positioning multiple X-ray cameras, one can appreciate the broad application to other industrial, commercial and medical environments using PM DC motors for intermittent operator-controlled uses.

The speed controller of the present invention can be provided at a low cost and in small size. In contrast to the available motor controllers for PM DC motors which are overly sophisticated, the present invention does not require a control computer or a servo-type control.

Moreover, prior art speed controllers, which use multi-axis joy sticks lack durability, due to the many movements permitted, and the resultant chances of breakage. Unlike the prior art, the joy stick feature of the present invention moves left or right in a single axis, thus minimizing the possibility of breakage while maximizing ease of use. In fact, in the present invention, variation of speed with load is easily compensated by the human operator. Since conventional joy sticks, which are commercially available, are too sophisticated, typically 2-axis, these are expensive and lack ruggedness. Therefore, the joy stick feature is integrated with the controller. Since the custom single axis joy stick of the present invention is integrated, a rugged joy stick is maximized, while the role of electronics is minimized in the design process to achieve the above objectives.

By limiting the electronics to a single element, such as a darlington transistor, a saving in power supply cost is realized, since this eliminates the requirement for a supply of filtered direct current.

Use of a darlington transistor in a simple emitter follower amplifier stage does mean that efficiency is low and substantial heat may be dissipated in the transistor at low to medium speeds. However, in the present invention, the controller is used for intermittent motion of fairly small motors, so this advantage is of little consequence. The speed controller of the present invention does not require a filtered power supply and space for a printed circuit board for support electronics, as in chopper-type control devices which may also generate undesirable electrical noise.

DESCRIPTION OF THE DRAWINGS

The present invention can best be described in conjunction with the following drawings, in which.

DETAILED DESCRIPTION OF THE PREFERRED EMBODIMENT

Figure 5:
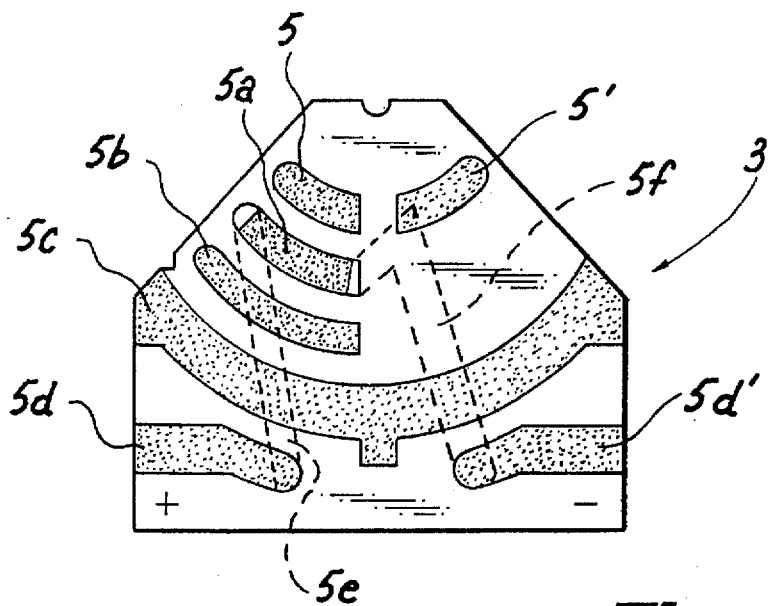
FIG. 5 is a side elevational view of one of two identical substrates within the motor speed controller as in FIG. 3, showing conductive traces therein.
Figure 8:
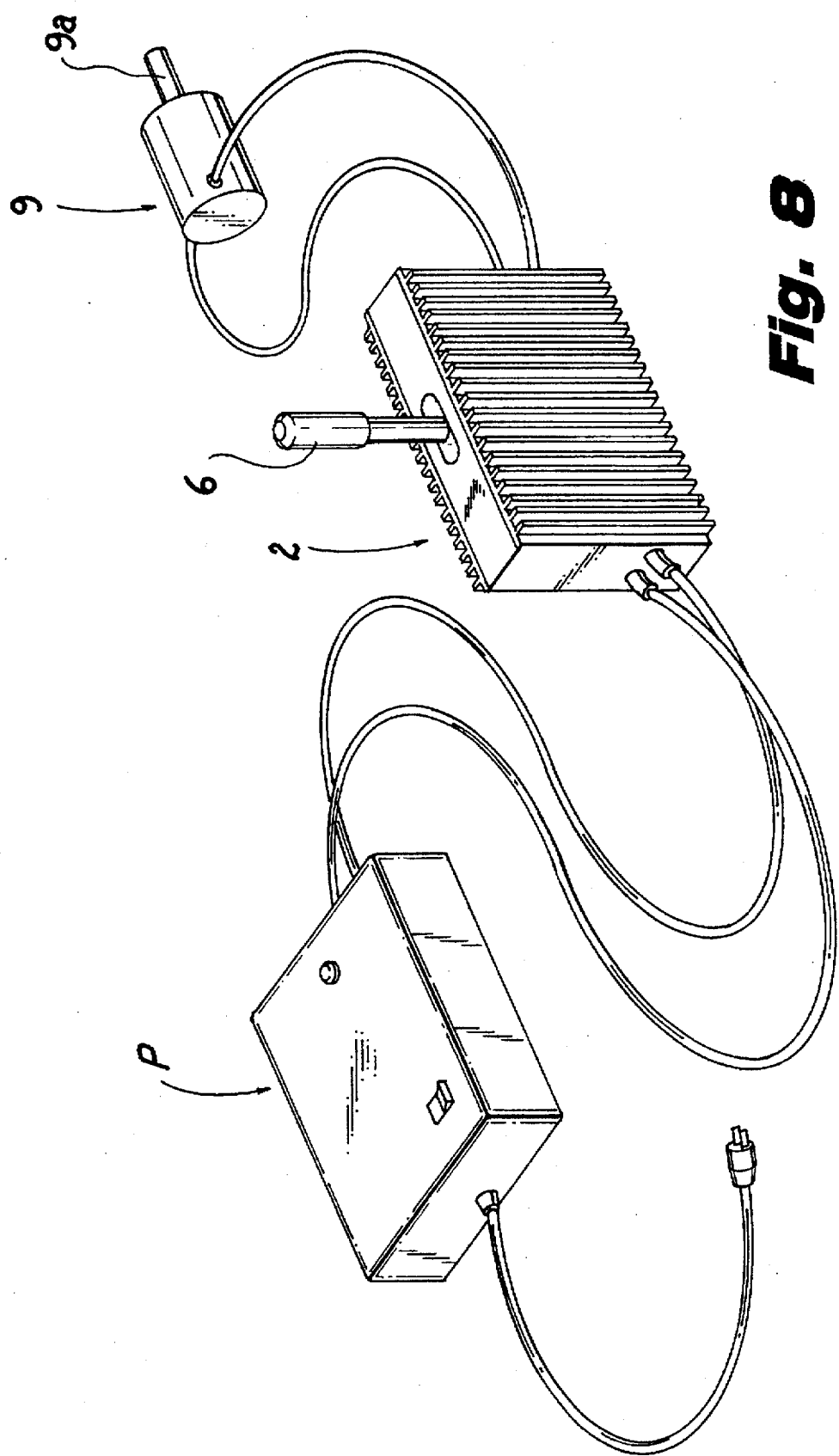
FIG. 8 is an isometric sketch showing the main elements of the control system of the present invention.

FIG. 8 shows speed controller 1 of the present invention connected on one side to power supply P and on the other side to direct current DC motor 9. The speed and direction of spindle 9a of DC motor 9 is controlled by the single axial movement of pivot handle 6 which moves a contact element holder 8 arcuately within body 2 of speed controller 1 to contact selected conductive traces on each of two substrates 3, 4 within body 2 of speed controller 1, as shown in FIG. 5.

As shown in FIGS. 1–7, speed controller 1 includes a body 2 having two identical substrates 3, 4. Each substrate 3, 4 has flat, arcuately extending conductive traces 5, 5', 5a, 5b, 5c, 5d thereon. A pivotable single axis joy stick handle 6 moves contacts 7 against selected portions of arcuate conductive traces 5, 5', 5a, 5b, 5c, 5d. The direction and speed of a DC motor 9 is controlled by the arcuate movement of contacts 7, 7a, 7b, 7c, 7d contacting traces 5, 5', 5a, 5b, 5c, 5d on substrate 3. Similarly, contacts 7', 7a', 7b', 7c', 7d' contact identical traces 5, 5', 5a, 5b, 5c, 5d on substrate 4. The movement of contacts 7, 7a, 7b, 7c, 7d along arcuate conductive traces 5, 5', 5a, 5b, 5c, 5d, are controlled by pivoting of pivotable handle 6 about pivot pin 6a.

Substrate 3 is positioned parallel to the other substrate 4 along opposite walls 3a, 4a, respectively, of a generally finned, aluminum heat sink construction. Handle 6 has extending therefrom contact holder 8 holding sets of contacts 7, 7a, 7b, 7c, 7d and 7', 7a', 7b', 7c', 7d', thereon.

Figure 1:
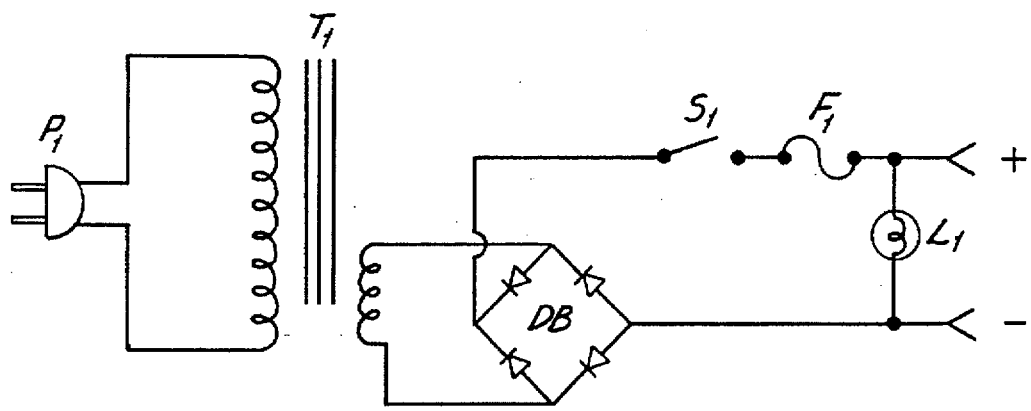
FIG. 1 is a schematic diagram of the power supply of the motor speed controller of the present invention.

FIG. 1 shows a schematic diagram of the power supply for speed controller 1, including a step down transformer (T1), a full wave diode rectifier bridge (DB), a switch (S1), a fuse (F1), and an optional pilot lamp (L1). No filter capacitors are used. A thermal or magnetic circuit breaker can be substituted for the fuse. The current rating of transformer (T1) can be specified to serve a single direct current (DC) controller 1/motor or it can serve a plurality of similar, separate controllers and motors. In a preferred embodiment, the transformer secondary was rated at 18 volts at 3 amps.

Figure 2A:
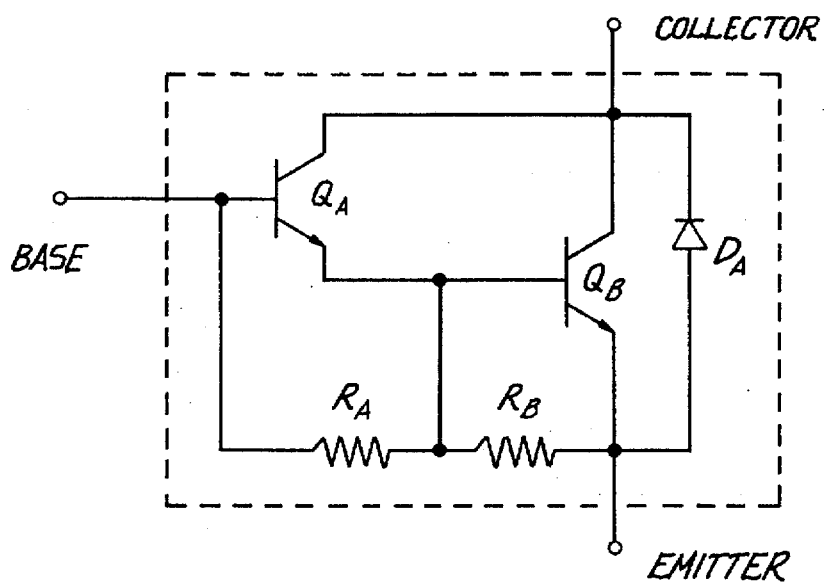
FIG. 2A is an internal schematic diagram of the darlington transistor used in the present invention.

FIG. 2A shows an internal schematic of an NPN darlington pair of transistors QA, QB. This schematic is typical of current power darlingtons. Base/emitter shunt resistors (RA and RB) as well as a reverse voltage diode (DA) are included in the darlington transistor package.

Speed controller 1 uses a darlington, such as a Motorola TIP 142 darlington, which has the following maximum ratings:

Collector-emitter voltage: 100v

Collector-base voltage: 100v

Total Power Dissipation: 125 Watts

Figure 2B:
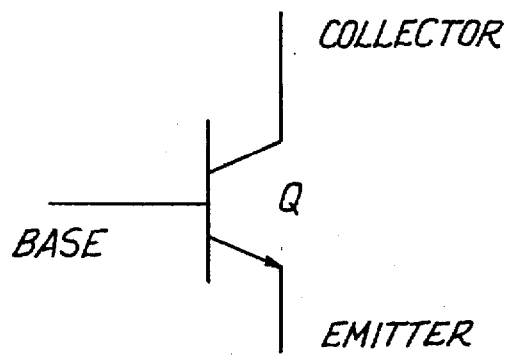
FIG. 2B is a simplified symbol used to represent the darlington transistors of the present invention.

The darlington has high current gain (>1000) and is economical, typically costing under $2.50 each in small quantities. Internal shunt resistors (Ra) (Rb), and internal diode (Da), make these devices more immune to damage by static electricity and voltage transients. The high gain insures adequate operation from a potentiometer element without the need for a driver stage. FIG. 2B shows a transistor symbol in a shorthand substitute depiction for the circuit shown in FIG. 2A for the darlington transistors, Q1 and Q2, used in controller 1.

As shown in FIG. 5, conductive traces 5, 5', 5a, 5b, 5c, 5d include a pair of uppermost arcuate traces 5, 5', each trace 5, 5' connected to an emitter for forward and reverse direction. Below traces 5, 5' is positioned conductive trace 5a, which is a resistive trace connected to a collector, and below conductive trace 5a is conductive trace 5b, which is connected to a base. Below conductive trace 5b are conductive trace 5c, which is connected to DC motor 9, and a pair of lowermost conductive traces 5d, 5d' which are connected to voltage input and one connected to voltage output. On a reverse side of substrates 3, 4 connection traces 5e, 5f are provided. Connection trace 5e connects resistive trace 5a and conductive trace 5d connected to the positive voltage input. Connection trace 5f connects right hand trace 5' to resistive trace 5a and negative voltage input trace 5d'.

Figure 3:
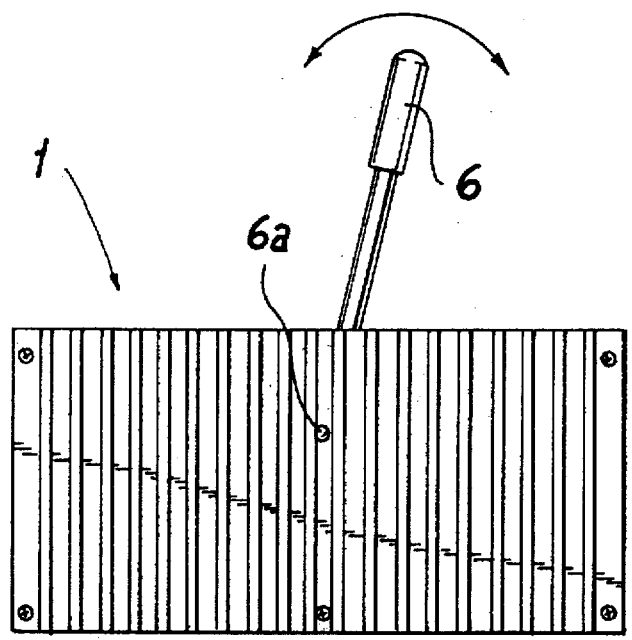
FIG. 3 is a side elevational view of the motor speed controller of the present invention.

Speed controller 1 depicted in FIG. 3 can be quite small. A typical prototype unit measures about 2.7" high (6.9 cm) by about 4" (10.2 cm) wide by about 1.1" (2.8 cm) deep, exclusive of protruding handle 6. Side walls 3a, 4a are constructed of a finned aluminum extrusion used as a heat sink for darlington transistors Q1, Q2.

Figure 4:
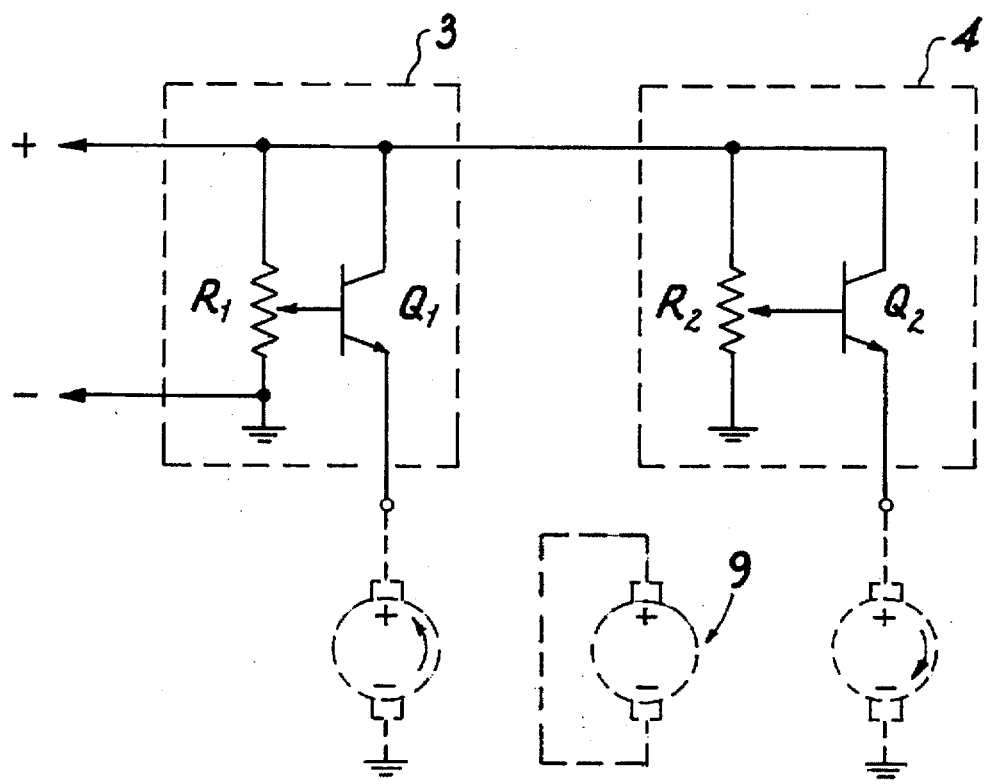
FIG. 4 is a schematic diagram of the motor speed controller as in FIG. 3.

FIG. 4 shows a schematic diagram of speed controller 1, wherein Q1 and Q2 are power darlington transistors. R1 and R2 are potentiometers formed by a deposited and or fired resistance stripe on either substrate 3 or 4, interacting with a corresponding set of movable contacts 7, 7a, 7b, 7c, 7d or 7', 7a', 7b', 7c', 7d'. The basic circuit is repeated on substrates 3, 4 or special circuit boards, one for each motor direction.

In FIG. 4, substrate 3 is shown to contain potentiometer R1 and darlington transistor Q1 in an emitter follower circuit to control the motor for counter clockwise operation. Similarly, substrate 4, in conjunction with darlington transistor Q2 and potentiometer R2 controls motor speed for clockwise operation. The direct current DC motor 9 shown as a dotted entity, is switched to the various connections shown by the action of control handle 6 which moves contact sets 7, 7a, 7b, 7c, 7d and 7', 7a', 7b', 7c' 7d' on identical pairs of conductive traces 5, 5', 5a, 5b, 5c, 5d of respective two substrates 3, 4 in addition to the contact on the resistive traces which controls speed. In the center position of control handle 6, the motor 9 is essentially disconnected from the rest of the circuit and is shorted out by the action of a special pair of contacts 7d, 7d' on the end of contact holder 8 which make contact with the shorting tabs on traces 5c.

In the preferred embodiment, the total handle movement of handle 6 is about 80 degrees of arc with maximum speed achieved when handle 6 is moved to the extreme ends of movement, decreasing to zero speed when contact holder 8 is at the center. Motor reversal occurs when contact holder 8 is moved on either side of the center zero position.

FIG. 5 shows substrate 3 of two identical substrates 3, 4, which substrates 3, 4 can be either constructed using a ceramic insulating substrate with fired conductive and resistive traces 5, 5', 5a, 5b, 5c, 5d, 5e, 5f screened on, as in the preferred embodiment, or using an epoxy/glass or other commonly used printed circuit board (PCB) insulating substrates and normal PCB fabrication techniques.

In speed controller 1 of the preferred embodiment, the resistive element trace is a nominal 20,000 ohms. If ceramic is used as a substrate material, the insulated areas in the contact region are preferably covered with a smooth glass layer to reduce contact wear from the normally abrasive ceramic surface. Substrates 3, 4 are a "two layer" circuit, since the pair of conductive connection traces 5e, 5f with "via connections" are required on the reverse side to "jumper" or connect trace segments 5a to 5d and 5a to 5' and 5d' respectively as shown in dotted lines in FIG. 5.

In speed controller 1, two substrates 3, 4 are used with the respective identical pairs of conductive contact traces 5, 5', 5a, 5b, 5c, 5d, 5d', facing each other with moving contact holder 8 riding between them, thereby contacting both substrates 3, 4.

Due to this geometric arrangement, a single substrate design is just used twice. This is more cost effective than using a single darlington and potentiometer with two different types of substrates to form a reversing switch. Also, heat is more easily dissipated if a separate darlington and heat sink is used for each direction.

Figure 6:
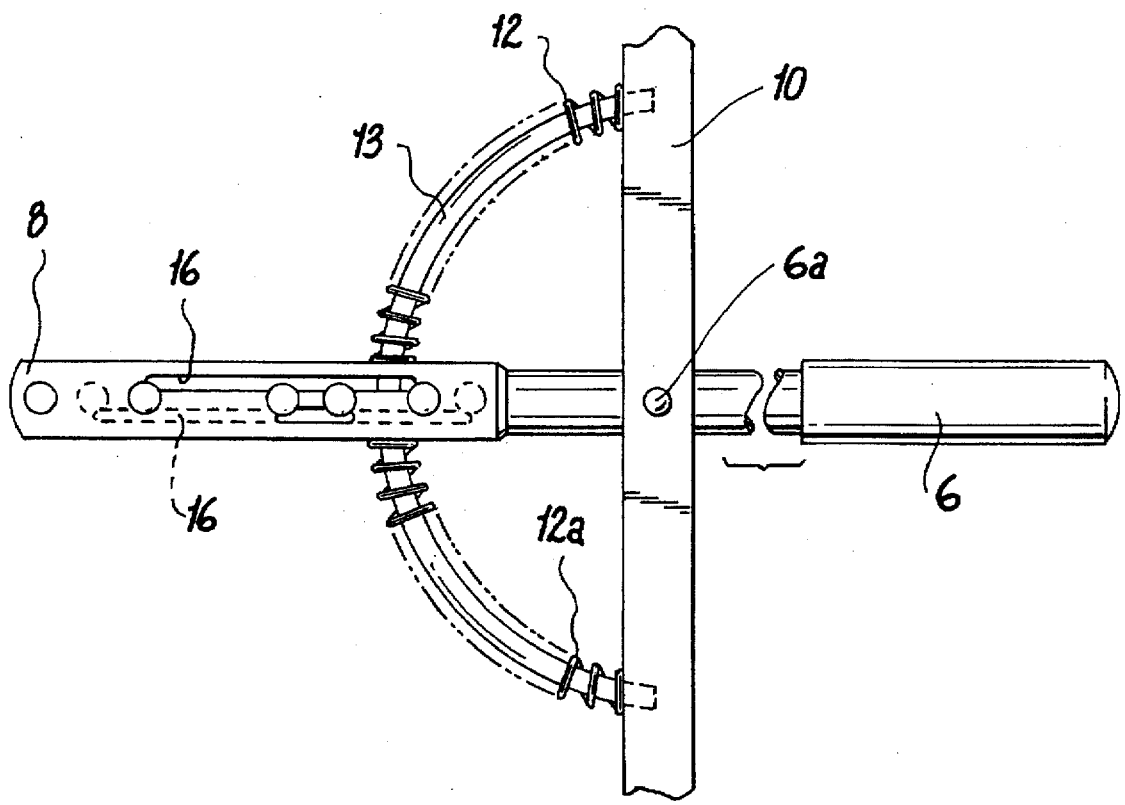
FIG. 6 is a close up view of the handle and moving contact holder of the motor speed controller as in FIG. 3; and, FIG. 7 is an exploded end view of the motor speed controller as in FIG. 3.

Pivotable handle 6 and moving contact holder element 8 are shown in FIG. 6. Contact holder element 8, as well as the top and bottom spacer blocks 10, 11, can be machined out of a machinable ceramic, thermoset plastic or a number of high temperature engineering grade thermoplastics.

As shown also in FIG. 6, optional restoring springs 12, 12a along arcuate guide bar 13 can be used to bias handle 6 in the "off" or "zero speed" position at the center of the range of motion. With this feature, if the user releases handle 6, the motor 9 will be automatically stopped regardless of direction.

Figure 7:
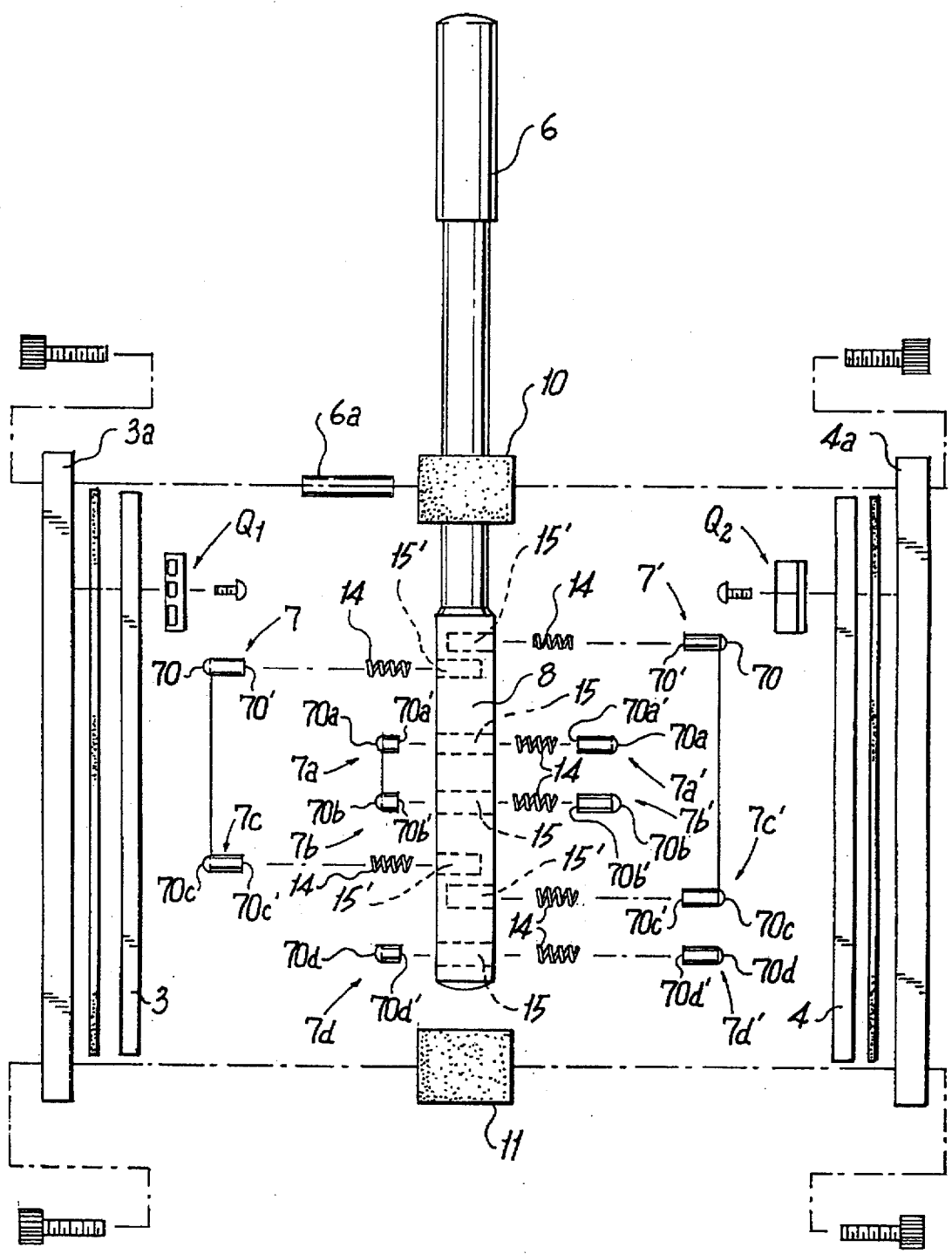

To understand the operation of the various elements of speed controller 1, it is necessary to refer to FIGS. 5, 6 and 7 simultaneously. Contact elements 7, 7a, 7b, 7c, 7d and contact elements 7', 7a', 7b', 7c' 7d' as in FIG. 7, are small metal cylinders each with a rounded closed end 70, 70a, 70b, 70c, 70d and a hole 70', 70a', 70b', 70c', 70d' on the opposite side to partially capture a contact spring 14. Contacts 7, 7a, 7b, 7c, 7d and contacts 7', 7a', 7b', 7c', 7d' either reside in through holes 15 or in blind holes 15' in moving contact holder 8 as shown in FIGS. 6 and 7. Except for the contacts 7d, 7d' in the far end thru hole 15, the other contacts 7, 7a, 7b, 7c and 7', 7a', 7b', 7c' are electrically connected in pairs, as shown in FIG. 7.

FIG. 6 also shows grooves 16 in contact holder 8 to accommodate the contact connecting wires.

As shown in FIG. 5, substrate 3 has long lower conductive trace 5c, which is connected to one of the motor terminals of motor 9. The other motor terminal is connected to the corresponding terminal on the other substrate 4. Conductive trace 5c, as well as the short upper top traces 5, 5' are wider than the other traces 5a, 5b, 5d, 5d'. This is to accommodate contacts in either position of the "sandwich" since the contacts on the different sides of the contact holder that ride on these traces are offset.

Resistive trace 5a is connected to trace 5d at the positive (+) voltage input on one end and to trace 5d at the negative (−) voltage input on the other end. These connections are made on the back side of each substrate 3, 4. If contact holder 8 interacts with the left position of substrate 3 shown in FIG. 5, contact 7, touching top conductive trace 5, which is the "emitter" trace, is connected to contact 7c touching the bottom motor trace 5c, and motor 9 is connected to the emitter. If one perceives a mirror image substrate layout on top of the one shown (i.e. looking through the back side to see the contact traces), the other motor conductive trace 5c is then attached to the other part of top conductive trace 5, which is on substrate 4. Therefore, the other motor connection is attached to the negative supply.

Similarly, two centrally located contacts 7a, 7b, a connected pair, connect the "wiper" contact of the potentiometer to the "base" trace of the darlington transistor Q1, Q2. Since these contacts 7a, 7b are "double-ended" i.e. they reside in through holes 15 in contact holder 8, contacts 7a, 7b serve the same function regardless of whether contacts 7a, 7b are in the left-of-center or right-of-center position, albeit operating different potentiometers on different substrates with different darlingtons.

In the central region, all contacts lose contact with all traces before the end contacts touch the shorting tabs on the motor trace. These end contacts are also "double-ended" thereby connecting the motor traces on both substrates 3, 4, which essentially shorts motor 9 at its terminals. A shorted PM DC motor 9 acts as a dynamic brake, quickly bringing it to a physical stop. Also, a gear motor provides high resistance to "back driving" when shorted due to the dynamic brake action. This is desirable for most applications, which is just the opposite of "creep" or "jitter".

Looking again at FIG. 5, motor reversal is easily understood by observing that one motor lead, i.e. substrate 3, is connected from the emitter on the left section of control to the negative supply as the user moves contact holder 8 to the right position. By the mirror image on substrate 4, the other motor contact moves from the negative supply terminal to the emitter connection. This design depends on the "quiet" behavior of darlington transistor Q1 or Q2 with internal shunt resistors, since at least one darlington transistor Q1, Q2 always has its base dangling. Smooth speed control is achieved through the use of the integral resistive traces 5a and moving contacts 7a.

The attributes of the system are that speed controller 1 is easy to set up and use. It is simply connected with four connections, two to the power supply and two to the motor. No computer is involved. The user uses the one-axis joy stick handle 6 in an intuitive manner.

The components are few and inexpensive. Expense is saved by using an unfiltered and unregulated single voltage power supply. Speed controller 1 can be manufactured in small batches by a small machine shop. The only purchased custom item are substrates 3, 4. The design of speed controller 1 is such that no molded items are required. The top and bottom insulating spacers can be made on a CNC milling machine. Pivotable handle 6 and moving contact holder 8 can be made on a lathe and CNC. The finned aluminium sides are simply cut to size and drilled and tapped. The contacts themselves can be turned or purchased. Other hardware and contact springs are purchased items. Assembly would require minimal wiring and then mechanical assembly.

Finally, speed controller 1 is repairable by personnel with no electronics training or test equipment. A problem can be quickly solved by disconnecting a faulty controller and substituting a spare controller. The faulty controller is then carefully disassembled and visually inspected. Faults such as dirty, pitted or eroded traces or contacts are easily spotted. Contact springs are also easy to inspect with no tools.

Also, speed controller 1 can be returned to a manufacturer for repair; it is easy to ship, small and not overly sensitive to static electricity or physical shock.

It is also noted that other modifications may be made to the DC motor speed controller of the present invention without departing from the scope of the present invention, as noted in the appended claims.

I claim:

1. A speed controller for a small direct current permanent magnet (DC) motor comprising:

a) a DC motor;

b) power supply means for supplying DC electric power for the operation of said motor;

c) means for controlling the speed and direction of said motor comprising a hollow body having a pair of parallel, spaced walls and a joy stick extending out of said hollow body;

d) means pivotally supporting said joy stick within said hollow body, said joystick having a first end extending from a pivot within said hollow body and a second end extending out from said hollow body from said pivot so that said second end can be moved manually for controlling the speed and direction of said motor, said joystick movable in a plane between first and second end positions and having a zero motor movement position at a point between said end positions, said first and second end positions producing maximum speed of said motor in opposite directions with the speed increasing as said joystick moves from said zero motor movement position toward an end position;

c) each wall having a flat surface within said body facing said joystick being coated with a substrate of electrically nonconductive material;

d) potentiometer means for each of said substrates for controlling the power delivered to said motor comprising a resistive trace on each of said substrates, a contact mounted on said joystick for each of said substrates for acting as a potentiometer wiper on each said resistive trace, the voltage of said power source being placed across said resistive trace;

e) high gain transistor means including a transistor within said body for each substrate, the base of said transistor being connected to said contact and the emitter of said transistor delivering the power to said motor as selected by the position of said joystick; and f) said walls having finned heat sink means for rejecting heat developed within said body.

2. The speed controller of claim 1 in which each said high gain transistor means includes a power darlington transistor with a pair of base/emitter shunt resistors and a reverse voltage diode.

3. The speed controller of claim 1 in which each substrate has a conductive trace with a tab located at said zero motor movement position of the joystick for connecting the emitter of each transistor to said motor, contact means on each side of said joystick for contacting said tab for shorting out said motor when the joystick is in the zero motor movement position.

4. The speed controller of claim 1 having restoring springs biasing said joystick in the zero motor movement position so that when said joystick is released said joystick will return to the zero motor movement position resulting in said motor coming to a halt.

5. The speed controller of claim 3 in which each said substrate is provided with conductive traces to receive the power from said power source.

6. The speed controller of claim 5 in which the two substrates are mirror images of each other and motor reversal occurs when one substrate has a conductive trace connected to an emitter of the transistor for said one substrate and the opposite facing substrate has a conductive trace connected to an emitter of its transistor.

* * * * *